No. 624,797. Patented May 9, 1899.
W. HARRIS.
BREAD OR PASTRY BOARD.
(Application filed Jan. 15, 1898.)
(No Model.)
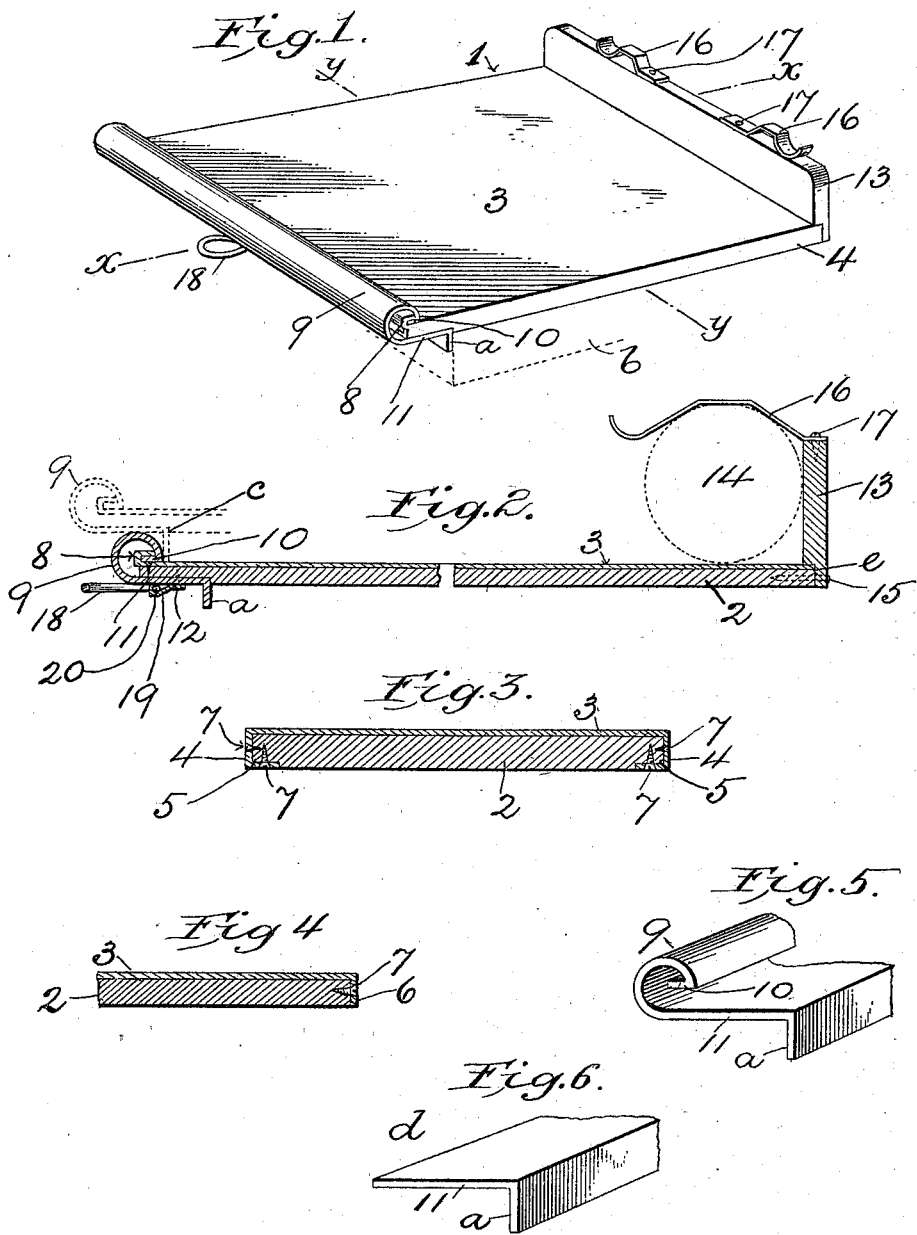
WITNESSES
A. B. Diggs
C. E. Jones.
INVENTOR
William Harris,
By Chas. J. Gooch,
his Attorney

UNITED STATES PATENT OFFICE.

WILLIAM HARRIS, OF CAMBRIDGE, OHIO.

BREAD OR PASTRY BOARD.

SPECIFICATION forming part of Letters Patent No. 624,797, dated May 9, 1899.

Application filed January 15, 1898. Serial No. 666,786. (No model.)

*To all whom it may concern:*

Be it known that I, WILLIAM HARRIS, a citizen of the United States, residing at Cambridge, in the county of Guernsey and State of Ohio, have invented certain new and useful Improvements in Bread or Pastry Boards; and I do hereby declare the following to be a full, clear, and exact description of the invention, such as will enable others skilled in the art to which it appertains to make and use the same.

This invention relates to improvements in the construction of bread and pastry boards.

Briefly stated, my improved board, on which dough may be mixed, kneaded, and rolled in the preparation of bread, pastry, and the like, comprises a base composed of one or more sections of wood, wood or straw pulp, or similar material, a metallic top surface having flanged or lipped edges to embrace the side edges of the base, a right-angled head-piece, rolling-pin keepers pivoted to said head-piece, a curved bead parallel with the bottom edge of the board, and a combined base batten and brace adapted to strengthen and prevent the warping of the base of the board and also protect the bead in packing and storing and transportation and also serve as a stop or brace for the board against the edge of the table, whereby said board will be held steadily in position while in use, the construction and arrangement of which several features will be hereinafter specifically set forth.

In the drawings, Figure 1 represents a perspective view of my improved bread and pastry board. Fig. 2 represents a longitudinal section thereof on the line $x\,x$ of Fig. 1. Fig. 3 represents a transverse section on the line $y\,y$ of Fig. 1. Fig. 4 represents a sectional detail view of a modification. Fig. 5 represents a detail view of the combined curved bead, batten, and table-stop and bead-protector. Fig. 6 represents in detail view the combined bead-protector, base-batten, and table-stop separately from the bead.

The object of my invention is to produce an improved board whereon dough for the formation of bread, pastry, and similar articles of food may be mixed, kneaded, and rolled with greater ease and facility and with greater cleanliness and less waste of material than where wood-surfaced boards are employed.

My improved board also presents additional advantages in the provision of top and bottom stops, confining the flour and dough to the board, a combined base-batten to strengthen and prevent the warping of the base, a table-stop serving to brace the board against a table, and a protector for the curved bead or bottom flour and dough guard in packing and transportation and in affording adjustable means for securing the rolling-pin when out of use.

A metallic-surfaced dough mixing, kneading, and rolling board has certain advantages over a board having a wooden or other absorbent upper surface. It is non-absorbent and therefore can be maintained in a sweet and clean condition by simply wiping it after use with a damp cloth. Dough will not adhere thereto, but can be more readily manipulated, can be more smoothly rolled, and will not absorb odors from the previous use of the board, which is often the case where wooden-surfaced boards are used.

1 represents my improved board.

2 represents the base, which may be formed, as shown, either of a single piece of wood or of straw or pulp board or other suitable material or of one or more sections thereof grooved, glued, or otherwise connected together.

3 represents the surface on which the dough is manipulated. This surface may be of any sheet metal or alloy thereof and may be either plain, enameled, plated, or otherwise coated, as individually preferred. The side edges of this sheet-metal base-sheathing 3 are formed with lips or flanges, which, as shown at 4, may be of substantially U shape in cross-section to constitute grooves or pockets 5, within which the base 2 may be slid to frictionally bind said base and sheathing compactly together, or, as shown at 6, said flanges or lips may be simply right-angled to embrace simply the side edges of the base instead of both the side edges and bottom of the base 2, as at 4 5.

7 represents brads, screws, or nails connecting said lipped or flanged portions and the base 2 together.

8 represents a returned lip or flange formed on the bottom edge of the top sheathing 3, and 9 represents a curved bead having a lip or flange 10, which, as shown, lockingly engages with said lip or flange 8, said bead 9 extending, as shown, parallel with or transversely across the bottom of the board and upwardly thereof and also around its bottom edge in a curvilinear direction and embracing the bottom of the base, as at 11, where it is connected to said base by any suitable means, as by brads 12, nails, screws, or the like. The function of this bottom bead 9 is to serve as a stop to prevent the flour and dough under manipulation slipping off the bottom edge of the board. While I prefer to construct this curved bead 9 of metal, it may without departing from my invention be formed of any other suitable material. From the horizontal base portion 11 of said bead, which operates as a batten to strengthen and prevent the warping of the base of the board, extends vertically downward a reverse L-shaped lip $a$, which serves when the board is in use as a table-stop, whereby said board is braced against the table and held steadily in position, as indicated in the dotted lines $b$, which represent the table. In packing and transportation this lip $a$ serves, as indicated in dotted lines $c$, as a shield and protector for the curved bead 9 to support the superimposed board above said bead and prevent the pressure of said board on or injury to said bead by the weight thereon of the board nested above it. In lieu of forming this combined base-batten, table-stop, and bead-protector integral with said bead it may be formed separately therefrom, as shown at $d$, and secured to the base by screws or other suitable devices.

13 represents the head-piece. This may be of wood, metal, or any other suitable material and may have advertising or other matter thereon, if desired. It has rabbet connection, as at $e$, with the end of the base. The function of this head-piece is threefold. It serves as a stop to retain the flour and dough in position and prevent the same dropping off at the head of the board. It also serves to prevent the warping of the base at the head and also as a rest for the rolling-pin 14 when out of use, as shown in Fig. 2. Said head-piece, sheathing, and base are firmly secured together by nails, screws, or similar devices 15, such connection and arrangement assisting in preventing the warping of either the base or the head-piece.

16 represents spring clips or keepers, which are pivotally secured by screws or the like 17 to the top edge of the head-piece 13. These spring clips or keepers 16 when the board is being used are turned on their pivots so as to lie parallel with the top edge of the head-piece, as shown in Fig. 1, thus placing them out of the way of the rolling-pin 14 while the latter is in use. When said spring-clips are drawn out, as shown in Fig. 2, by pressing the rolling-pin against their front ends they will by reason of their flexibility give to such pressure and admit of said rolling-pin being pressed into the position shown in Fig. 2 and clamped therein by said spring-clasps. When it is desired to release said rolling-pin, it is simply drawn away from said spring-clasps, which will readily yield to such draft, and said clasps are then turned parallel with the head-piece and out of the way.

18 represents a hanger by means of which the board may be suspended when out of use. This hanger may be of any approved construction, but preferably has hinge or pivotal connection 20 with a lug or strip 19, secured to the under face of the board, as shown.

It is preferred that the under surface of the base be recessed at those portions where the flanges of the sheathing and the bottom flange of the curved bead and the base-batten come in order that such portions may be received therein and thereby present a continuous surface at the bottom of the base.

Having thus described my invention, what I claim is—

1. A bread and pastry board consisting of a base, a sheet-metal sheathing covering the upper face of said base, a head-piece extending at a right angle from said base, a curved bead extending transversely across the bottom of the upper face of the board, and a reverse L-shaped lip secured to and extending transversely across the bottom of the base of the board, substantially as and for the purpose set forth.

2. A bread and pastry board having at its lower edge a curved bead extending in raised position across the lower portion of the face of the board and around the bottom edge thereof and having a reverse L-shaped lip secured to and extending transversely across the bottom of the base, substantially as and for the purpose set forth.

3. A bread and pastry board consisting of a base, a sheet-metal sheathing covering the upper face of said base, a head-piece, a curved bead extending transversely across the lower edge of the board and a right-angled, or L-shaped lip secured to the under face of the base to serve as a base-batten, table-stop and bead-protector, substantially as set forth.

4. A bread and pastry board consisting of a base a sheet-metal sheathing covering the upper face of said base, a head-piece having rabbet connection with said base, a curved bead extending across the lower edge of said base and a combined base-batten, table-stop and bead-protector connected with the bottom of the base, substantially as set forth.

In testimony whereof I affix my signature in presence of two witnesses.

WILLIAM HARRIS.

Witnesses:
A. R. McCULLOCH,
ROBT. F. SCOTT.